Dec. 18, 1962    H. F. SWENSON    3,068,889
MIX-AND-AIR FEED SYSTEM FOR DISPENSING FREEZERS
Filed June 15, 1961

INVENTOR.
HARVEY F. SWENSON
BY
Barnes + Seed
ATTORNEYS 3,068,889
MIX-AND-AIR FEED SYSTEM FOR DISPENSING
FREEZERS
Harvey F. Swenson, Seattle, Wash., assignor to Sweden Freezer Manufacturing Co., Seattle, Wash., a corporation of Washington
Filed June 15, 1961, Ser. No. 117,357
3 Claims. (Cl. 137—386)

The present invention relates to a mix-and-air feed system for dispensing freezers and relates to improvements in the general type of feed system shown in United States Patent No. 2,924,951.

A principal object of the invention is to provide a mix-and-air feed system which will automatically charge the dispensing freezer with a substantially constant mix-air ratio responsive to dispensing of the frozen product.

Another object is to provide a feed system which includes the use of multiple mix storage tanks which are valve isolated and can be consecutively readily activated in the mix supply source.

The invention further aims to provide a mix-and-air feed system which is unusually sanitary in operation and the components of which can be readily disassembled for cleaning.

Other more particular objects and advantages of the invention will, with the foregoing, appear and be understood in the course of the following description and claims, the invention consisting in the novel construction and in the adaptation and combination of parts hereinafter described and claimed.

Figure 1:
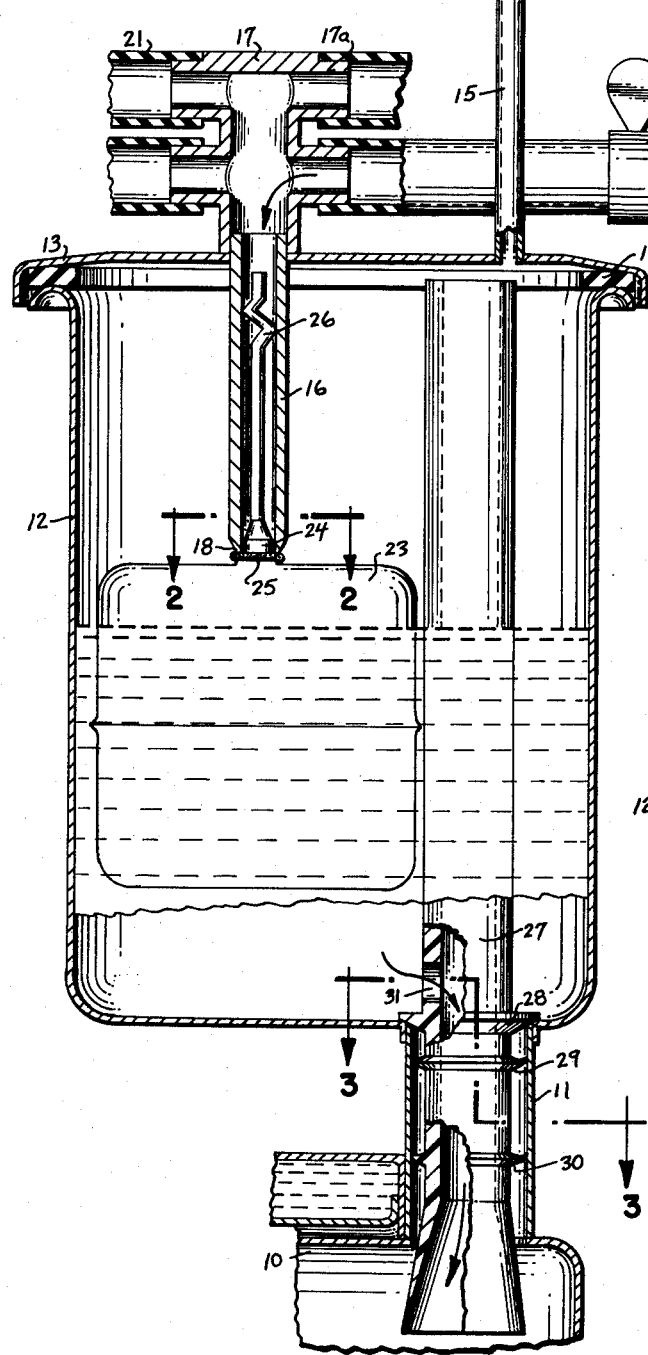

In the accompanying drawings:

FIGURE 1 is a vertical sectional view of the feed system in operation with a dispensing freezer, shown fragmentarily.

Figure 2:
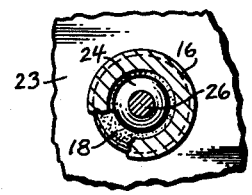
Figure 3:
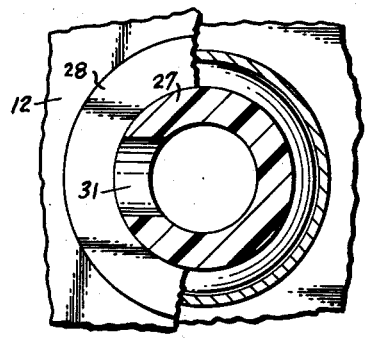

FIGS. 2 and 3 are horizontal sectional views taken along the lines 2—2 and 3—3, respectively.

FIGS. 2 and 3 are horizontal sectional views taken along the lines 2—2 and 3—3, respectively.

Referring to the drawings, 10 represents a freezing cylinder of a dispensing freezer having a dasher, a discharge gate for frozen product at one end, and an upstanding non-refrigerated inlet tube or neck 11 for mix and air adjacent the other end, a suitable such arrangement being shown in Patent No. 2,924,951. Mounted on the neck 11 is a reservoir tank 12 which is provided with a removable cover 13 fitted with a gasket 14 and having openings therethrough receiving an upwardly projecting vent tube 15 and a feed tube 16. The latter depends into the reservoir 12 from a manifold 17 positioned above the cover 13 and is externally tapered at its lower end to serve as a valve seat 18. This manifold is fed selectively from mix supply and storage cans 20 which for this purpose are vented at the top and have egress spouts on the bottom. The latter are detachably connected to nipples 17a of the manifold by respective flexible tubes 21 sleeved at their ends on the elbows and the nipples. Shut-off valves taking the form of spring clips 22 are provided for squeezing the tubes 21 to cut off flow from the mix cans 20 until supply from a selected one thereof is desired. Normally one mix can is exhausted at a time so that the others are in a standby or reserve status.

A float valve operates in the reservoir 12 to control flow from the manifold 17. The float component of this valve is denoted 23 and the valve component 24 has an O-ring 25 which seats against the valve seat 18 at the lower end of the feed tube 16. This valve component 24 has an extension 26 which slides in the feed tube 16 to guide the float valve relative to the seat 18 as the float rises.

Flow from the reservoir 12 to the freezing cylinder 10 is in turn controlled by a tubular valve 27 in the form of a standpipe which extends down from adjacent the vent 15, through the neck 11 and into the freezing cylinder. This valve 27 is of the type shown in the aforementioned Patent No. 2,924,951, and may be of one-piece polyethylene construction providing annular flanges 28—30. The first of these is beveled at its underside to seat on the rim surrounding the upper end of the neck 11 while the flanges 29—30 fit snugly within the neck to serve as seals supplementing the neck closure effected by the flange 28. For this sealing purpose the flanges 29—30 are feathered at their outer edge and are slightly oversized relative to the inside diameter of the neck 11 so that they will be flexed upwardly slightly against the neck wall as the valve 27 is inserted from above. Accordingly, flow from the reservoir is limited by an orifice 31 located in the valve 27 adjacent the flange 28 so as to be near the bottom of the reservoir. The flow capacity of this orifice 31 is made sufficiently less than that of the longitudinal bore of the valve 27 to give the proper mix to air ratio, the air being supplied through the valve bore from the top of the reservoir which is in turn supplied from the atmosphere by the vent tube 15. An extension 15a may be sleeved on the latter to insure a clean air supply.

To prepare for operation the reservoir 12 is charged by releasing the shut-off clip 22 for one of the mix cans 20 so that mix from the can can flow to the reservoir through the respective flexible tube 21, the manifold 17, and the feed tube 16. If the freezing cylinder 10 has not yet been charged, the mix will of course continue onward thereto from the reservoir via the mix-and-air valve 27 until the lower end of the latter is covered by mix. The reservoir will then fill until the float 23 seats the O-ring 25 against the seat 18 at the lower end of the tube 16, as shown in FIGURE 1. Then, when dispensing is commenced by the operator, after the mix has been frozen and whipped with air in the freezing cylinder, the mix and air for the cylinder are automatically replenished from the reservoir and atmosphere via the valve 27. As this replenishing of the freezing cylinder occurs the O-ring 25 unseats to permit the reservoir to be supplied with mix. The supply capacity for the reservoir is purposely greater than the discharge capacity of the orifice so that the vertical fluctuation of the float 23 is minute, and hence the liquid head in the reservoir 12 is kept virtually constant. In this way the mix-and-air ratio in the freezing cylinder for a given size of orifice is maintained virtually constant. When the supply tank is empty the operator need only switch to another tank by releasing the respective shut-off clip 22. If the operator does not notice that the supply tank has emptied, the mix in the reservoir 12 will act as a reserve supply. In this regard, tubes 21, manifold 17, and feed tube 16 are preferably fabricated from a transparent material so that the operator can readily view the float level and flow of mix.

The device can be readily disassembled for cleaning by disconnecting the flexible tubes 21 from the manifold 17, raising the latter and the related feed tube 16 free of the cover 13, removing the cover, and then lifting the float valve and mix-and-air valve out of the reservoir. It will be noted that the neck 11 permits the reservoir to be flushed and drained into the freezing cylinder 10 after the rest of the parts of the feed system have been removed.

It is believed that the invention will have been clearly understood from the foregoing detailed description of my now-preferred illustrated embodiment. Changes in the details of construction may be resorted to without departing from the spirit of the invention and it is accordingly my intention that no limitations be implied

What I claim, is:

1. In a liquid-and-air feed system for a dispensing freezer having a freezing chamber, a vented liquid reservoir elevated relative to said chamber, a standpipe communicating with said freezing chamber and extending through said reservoir to a level above a predetermined liquid head for supplying air to the chamber, said standpipe also communicating by an orifice with said reservoir near the bottom of the latter for supplying liquid to said freezing chamber, a cover on said reservoir having an air vent and carrying a depending liquid feed tube, a plurality of liquid supply tanks communicating with said feed tube, said air vent extending above the liquid level in said supply tanks, means for selectively isolating said supply tanks, and float valve means in said reservoir and operatively associated with said feed tube for closing the lower end thereof whenever the liquid head in said reservoir is at said predetermined liquid head.

2. In a liquid-and-air feed ssytem for a dispensing freezer having a freezing chamber a vented liquid reservoir elevated relative to said chamber a standpipe communicating with said freezing chamber and extending through said reservoir to a level above a predetermined liquid head for supplying air to the chamber, said standpipe also communicating by an orifice with said reservoir near the bottom of the latter for supplying liquid to said freezing chamber, a cover on said reservoir having a depending liquid feed tube, a supply manifold above said cover and connected to said feed tube, a plurality of liquid supply tanks, collapsible supply tubes connecting said tanks with said manifold, clamps for collapsing said supply tubes to selectively isolate the supply tanks, a vent for said reservoir above said predetermined liquid head, and float valve means in said reservoir and operatively associated with said feed tube for closing the lower end thereof whenever the liquid head in said reservoir is at said predetermined liquid head.

3. In a liquid-and-air feed ssytem for a dispensing freezer having a freezing chamber, a vented liquid reservoir elevated relative to said chamber, a standpipe communicating with said freezing chamber and extending through said reservoir to a level above a predetermined liquid head for supplying air to the chamber, said standpipe also communicating by an orifice with said reservoir near the bottom of the latter for supplying liquid to said freezing chamber, a vent for said reservoir above said predetermined head, a cover on said reservoir, a supply manifold above said cover and communicating with said reservoir, a plurality of liquid supply tanks, collapsible supply tubes connecting said tanks with said manifold, clamps for collapsing said supply tubes to selectively isolate the supply tanks, and valve means in said reservoir and sensitive to the level of liquid in said reservoir for shutting off said communication of said supply manifold with the reservoir when said level is at said predetermined head.

References Cited in the file of this patent
UNITED STATES PATENTS

| | | |
|---|---|---|
| 1,557,089 | Reasoner | Oct. 13, 1925 |
| 2,924,951 | Swenson et al. | Feb. 16, 1960 |